166-307
11/20/79    OR    4,174,753

United States Patent [19]
Graham

[11] 4,174,753
[45] Nov. 20, 1979

[54] WELL STIMULATION BY TWO-PHASE FLOW

[76] Inventor: John W. Graham, 210 County Rd. 147, Rte. 5, Box 58, Alvin, Tex. 77511

[21] Appl. No.: 831,162

[22] Filed: Sep. 7, 1977

[51] Int. Cl.$^2$ .................... E21B 43/27; E21B 43/122
[52] U.S. Cl. ............................... 166/307; 166/305 R
[58] Field of Search ............... 166/271, 273, 274, 275, 166/281, 282, 305 R, 307

[56] References Cited

U.S. PATENT DOCUMENTS

| | | | |
|---|---|---|---|
| 2,059,459 | 11/1936 | Hund et al. | 166/307 X |
| 2,124,530 | 7/1938 | Loomis et al. | 166/307 |
| 3,368,627 | 2/1968 | Hurst et al. | 166/307 |
| 3,481,404 | 12/1969 | Gidley | 166/307 |
| 3,568,772 | 3/1971 | Gogarty et al. | 166/307 X |
| 3,572,440 | 3/1971 | Hutchison | 166/307 X |
| 3,799,266 | 3/1974 | Kiel | 166/307 X |
| 3,917,535 | 11/1975 | Crowe | 166/307X |
| 3,937,283 | 2/1976 | Blauer et al. | 166/307 |
| 3,962,101 | 6/1976 | Crowe | 166/307 X |
| 4,034,810 | 7/1977 | Holloway | 166/274 |

OTHER PUBLICATIONS

Kirk-Othmer, *Encyclopedia of Chemical Technology*, 2nd Edition, vol. 19, pp. 554-555.
Kirk-Othmer, *Encyclopedia of Chemical Technology*, 1st Edition, vol. 5, pp. 701-703.
Egan, "The Preparation and Properties of Amines and Cationic Surfactants from Fatty Acids", *Journal of the American Oil Chemists' Society*, vol. 45, 1967, pp. 481-486.
Perry, *Chemical Engineers' Handbook*, Fourth Edition, 1963, pp. 17-21.

*Primary Examiner*—Stephen J. Novosad
*Assistant Examiner*—George A. Suchfield
*Attorney, Agent, or Firm*—Robert H. Epstein

[57] ABSTRACT

A method of treating a subterranean formation to remove fines lodged therein wherein a mixture comprising an aqueous liquid and an immiscible fluid is injected into the formation at matrix rates to cause two-phase flow.

11 Claims, 4 Drawing Figures

WELL STIMULATION BY TWO-PHASE FLOW

BACKGROUND OF THE INVENTION

1. Field of the Invention

This invention relates to the treatment of subterranean formations. In particular, it relates to the acid treatment of subterranean formations surrounding oil wells, gas wells and similar boreholes.

2. Description of the Prior Art

Acid solutions are often used to stimulate the production of fluids from limestones, dolomites, sandstones and other calcareous and siliceous formations surrounding oil and gas wells. The methods employed at pressures below fracture pressures are referred to as "matrix acidizing" methods. These methods involve the injection of an acid solution capable of reacting with constituents in the formation. The constituents may be a part of the formation itself (e.g., limestone or sandstone rock) or may be present as formation "fines". Material passing a No. 400 U.S. mesh ($<38\mu$) is usually referred to as fines. In addition to the well-known clays, formation fines may include materials such as quartz, dolomite, calcite and amorphous solids. Drilling fluid solids such as bentonite and barite may also be present due to earlier drilling fluid invasion.

It has long been known that formation fines can drastically reduce production. They tend to migrate and collect and restrict flow passages, or completely plug formation pores. The reduction in permeability caused by fines lodging in the pores in the critical flow region immediately surrounding the wellbore is particularly serious.

Fines plugging may involve several mechanisms including particle bridging, capillarity and mixed wettability phenomena. Bridging of fines can plug a pore several times larger than the average particle size of the fines. Once a bridge is formed, the fines become tightly packed as a result of differential flow pressure. The amorphous component of the fines may add a degree of cementation to the mass.

Perhaps less understood is the role of capillarity and the wettability of the fines. Sandstones and limestones tend to be predominantly water-wet so that water-wet fines lodged in pore spaces are immersed in the wetting phase. However, oil-wet spots may be present on the matrix proper and within the agglomerated fines so that some crude oil may be adhered thereto to further add to the complexity of the situation.

These factors frequently prevent the acid solution from contacting and reacting intimately with the fines. Only the outer surface of the packed fines is exposed. Although large volumes of acid may be used to dissolve the fines, acid treatments are frequently unsuccessful because the acid is incapable of reaching and reacting intimately with the material that plugs the pores. Since fines agglomerations are saturated with formation brine, dissolution of fines by acid depends on diffusion of acid into the agglomeration, and this is a very slow process.

Several prior matrix acidizing techniques have been developed, but none attack the problem of dislodging fines from the pores to permit intimate mixture with the acid solution.

Gidley (U.S. Pat. No. 3,481,404) teaches the injection of a mutual solvent, after the injection of an acid solution, to retard the formation of emulsions and promote water-wetting of the formation materials.

Clampitt (U.S. Pat. No. 4,007,789) employs alternate slugs of acid solutions and aqueous gels to improve the acidization of multiple zone formations.

Crowe (U.S. Pat. No. 3,962,102) contemplates the use of an acid-in-oil emulsion for the purpose of extending the reaction time of the acid.

Gogarty (U.S. Pat. No. 3,568,772) discloses the use of a micellar dispersion (microemulsion) as a preflush for the acid to condition the formation.

SUMMARY OF THE INVENTION

My invention provides a method for improving matrix acidizing treatments by causing the formation fines to mix intimately with the acid. Surprisingly, it has been discovered that if treating fluids are injected to cause multi-phase flow in a porous medium, immobile formation fines are dislodged from the pack. This permits them to mix intimately with the acid or other treating fluid. In the broadest embodiment of the invention, the treating fluid will comprise from 10 to 95 volume percent of an aqueous liquid and from 90 to 5 volume percent of immiscible fluid such as gas or hydrocarbon liquid. In a preferred embodiment, the ratio of the aqueous liquid and the dispersed fluid will range between about 1:1 and about 5:1.

Although I do not understand fully the reasons for the improved results of my invention, I believe it is principally due to the following mechanisms:

(1) The dispersed non-wetting phase flowing through the porous medium causes localized fluctuations in pressure within the medium. These localized pressure disturbances tend to force out fines plugs. As the flowing non-wetting phase encounters a non-plugged pore restriction, it momentarily halts until sufficient force is built up to squeeze it through the restriction. This momentary increase in pressure is effective in increasing the differential pressure across plugged restrictions leading from the same pore. Innumerable repetitions of this phenomenon throughout the porous medium lead to the dislodging of many fines plugs. When the wetting phase is acid, increased acidizing efficiency results.

(2) Associated with the flow of the dispersed non-wetting phase is a considerable amount of turbulence in the wetting phase. Each filament of the dispersed non-wetting phase experiences many decelerations and accelerations as it moves through the porous medium. Associated with this very irregular movement of the filament is a high degree of turbulence surrounding the leading and trailing segments of the filament. This turbulence in the continuous wetting phase is similar to the fore and aft ("wake") disturbances associated with a ship sailing through water. The turbulence aids in dislodging immobile fines from formation rock surfaces and pore restrictions. When the wetting phase is acid, then increased acidizing efficiency results due to improved mixing of the dislodged fines in the acid phase.

(3) If the formation being treated is an oil-bearing formation, then there are innumerable immobile residual crude oil globules present in the formation during the mud acid stage of the typical single-phase sandstone acidizing technique (hydrocloric acid stage followed by mud acid stage). These immobile residual crude oil globules interfere with the reaction of the mud acid and the fines agglomerations which are protected by them. In an acidization performed according to one embodiment of my invention, the residual crude oil globules coalesce with the injected dispersed oil phase and become a part of it. Therefore, the residual crude oil globules become, in time, residual dispersed phase globules, not necessarily occupying the same positions within the porous medium. During this transition, however, the effectiveness of the mud acid in these residual oil regions has been increased greatly.

Although my invention can be used in a variety of well treatments wherein it is desired to remove fines from a formation, its preferred application is in matrix acidizing, particularly sandstone acidizing.

In matrix acidizing, the method may be carried out by injecting a mixture of an aqueous liquid phase (preferably an acid solution) and a discontinuous fluid phase such as gas or hydrocarbon liquid into the formation to cause two-phase flow. The term "mixture" as used herein is used to distinguish the treating fluid from an emulsion. Emulsions will not produce the necessary two-phase flow mechanisms which dislodge the fines. An emulsion with the appropriate external phase, however, may be used as one of the phases in the mixture.

An acid solution preferably constitutes the aqueous phase of the mixture. Alternatively, an acid solution may be used after the treatment with a mixture in which the aqueous phase may include or may be free of acid.

DESCRIPTION OF THE PREFERRED EMBODIMENTS

Since my invention will preferably be used in the treatment of sandstone formations, it will be described in particular detail with reference to sandstone acidizing. However, I again emphasize that my invention contemplates wider application and specifically includes all matrix acidizing.

As mentioned previously, my invention broadly involves the injection into a subterranean formation at matrix rates a mixture comprising at least 10 volume percent of an aqueous liquid and not more than 90 volume percent of a dispersed fluid phase, preferably a hydrocarbon liquid, to effect two-phase flow in the porous medium.

Figure 1:
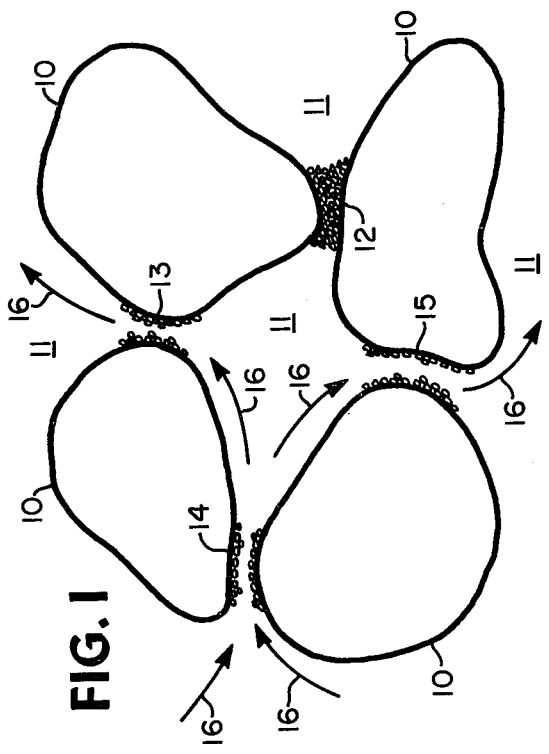
FIG. 1 is an enlarged view of a porous medium showing sand grains, fines, and formation fluids in the pore spaces.

The effects of the two-phase flow on the formation will be described with reference to the drawings. FIG. 1 is an enlarged somewhat simplified schematic view of a microscopic portion of a subterranean formation, wherein the sand grains are represented by numeral 10 and the pores by numeral 11. Formation fines are depicted at the junctures of the grains which define flow restrictions as at 12, 13, 14, and 15. Moreover, the sand grains will normally be compacted together but because of their irregular shapes will have flow spaces therebetween. It will be understood by those skilled in the art that residual crude oil globules will be present in some of the formation pores. As discussed previously, mobilization of these globules by the present invention is important in acidizing treatments. For simplification, however, these globules are not shown in the drawings.

The samll size of the pore restrictions frequently will prevent the flow of the non-wetting phase (i.e., oil). FIG. 1 also illustrates two types of flow restrictions caused by fines agglomeration. The fines at 12 completely plug the pore restriction so that no fluid can flow through it. The fines at 13, 14, and 15 are minor depositions and do not completely plug the flow passages. These fines depositions, however, reduce the permeability of this region and could eventually build up even more.

The injection of a single fluid (including emulsions) through this porous medium will follow generally the flow pattern depicted by arrows 16. Even if the treating fluid were a wetting acid solution, it still would have little effect on the formation fines. The acid solution would contact the outer surfaces of the fines at passages 13, 14, and 15, and only the outer edges of the plug at 12. Thus, the acid solution would be spent primarily in reaction with the sand grain surfaces away from the flow restrictions.

Figure 2:
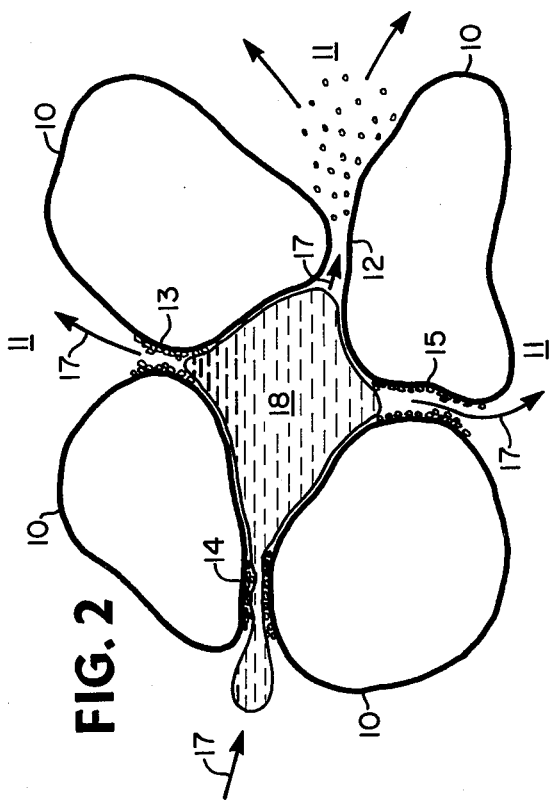
FIGS. 2-4 are schematic views illustrating in sequence the manner in which the practice of the invention dislodges fines from the porous medium and mixes the dislodged fines intimately with the injected wetting phase.

The two-phase flow characteristic of my invention, however, results in pressure disturbances and fluid agitation not possible with single phase flow. As illustrated in FIG. 2, the continuous phase, such as an acid solution, precedes the dispersed fluid. Numeral 17 represents the acid solution being forced from one pore 11 to adjacent pores through the restrictions 13 and 15. The dispersed fluid (e.g., oil), referred to as filament 18, enters the pore 11 through flow restriction 14 displacing the acid solution ahead of it through restrictions 13 and 15. When the non-wetting oil phase begins to flow through the restrictions 13 and/or 15 it will cause an increase in pressure within the pore 11 because of the interfacial tension between the wetting aqueous phase and the non-wetting oil phase. This additional pressure causes the plug at 12 to be dislodged as illustrated. Moreover, any residual oil in the pore 11 will coalesce with filament 18 and will become a part thereof.

The dispersed fines from restriction 12 will readily react with the acid. Moreover, this exposes the sand grain surfaces at restriction 12, permitting the acid to enlarge this flow passage.

Figure 3:
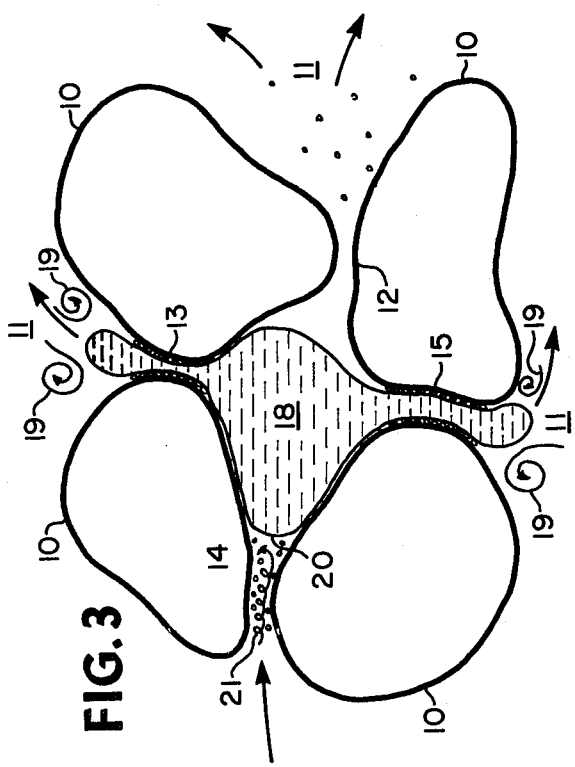

The pressure continues to increase until the filament 18 breaks through the flow passages 13 and/or 15 as illustrated in FIG. 3. This frequently occurs rather abruptly because the back pressure caused by the interfacial force is released rapidly as the leading segment of the oil filament expands into an adjoining pore space. The accelerated movement of the filament 18 creates turbulence or eddy currents 19 in advance of the filament. The trailing edge 20 of the filament will also produce eddy currents 21 in its wake. These eddy currents, particularly the eddy currents in the wake of the filament, agitate and dislodge fines from the formation rock.

Figure 4:
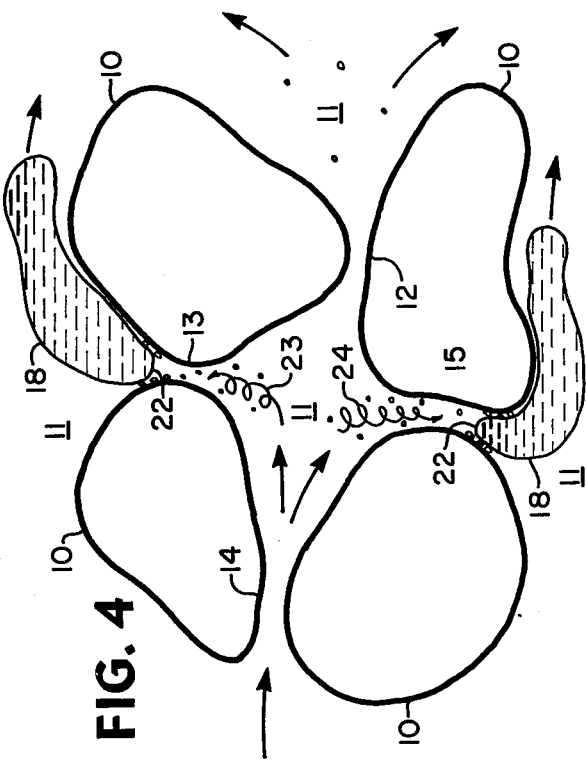

As injection continues, the filament 18 will leave the pore space 11, possibly in separate filaments as illustrated in FIG. 4. The trailing ends 22 of each of these filaments will create flow disturbances 23 and 24 through restrictions 13 and 15 much in the same manner as in flow restriction 14. The dispersed fines in the wake of each filament will readily react with the acid. It should be realized that innumerable filaments will be entering the flow restrictions throughout the invaded region and that many filaments will flow through any given pore.

Although other mechanisms may be involved, my observations, under microscope in the laboratory, of two-phase flow through micro models revealed that the mechanisms described above are predominant. I observed that the two-phase flow actually dislodged and dispersed the fines.

The preferred materials for use in the mixture will depend on the type of treatment desired and the properties of the formation. In the matrix acidizing treatment of a water-wet formation rock, the continuous phase may include aqueous hydrocloric acid, aqueous hydrofluoric acid, an aqueous solution containing a mixture of hydrochloric and hydrofluoric acid (mud acid), or any other acid used in the acid treatment of formations. It may also include a non-acid liquid since the main function of the two-phase flow is to dislodge the fines.

The dispersed or discontinuous phase must be substantially immiscible with the aqueous liquid and have a relatively high interfacial tension therewith to not only prevent emulsion formation, but also to cause the flow disturbances throughout the porous medium as described previously. The interfacial tension between the discontinuous phase and the aqueous liquid should be at least 5 dynes per cm. and preferably at least 10 dynes per cm. at 72° F. The discontinuous phase is preferably a hydrocarbon liquid, but gases such as nitrogen, carbon dioxide, air, and natural gases may be used in certain applications. Specific hydrocarbon liquids include n-hexane, toluene, benzene, diesel oil, kerosene, crude oil, refined oil, condensate, and liquified petroleum gases.

The volume concentration of the continuous phase should preferably constitute the major volume proportion of the treating mixture. The continuous phase normally will be an aqueous acid solution but may be simply water or brine. The balance will normally be the discontinuous phase. The mixture, however, should include at least 5 volume percent of the discontinuous phase. The most preferred ratio of aqueous liquid to discontinuous phase is between about 3:2 and about 4:1.

My invention may be carried out by several different techniques designed to result in two-phase flow in the formation at matrix rates and pressures. One technique involves the simultaneous pumping of the continuous phase and discontinuous phase at the proper volume ratio into a single injection line. The mixing resulting from the flow down the well will cause the immiscible fluids to be intimately mixed. The discontinuous phase, which will normally constitute the minor volume proportion of the mixture, will become dispersed in the aqueous phase as a multitude of filaments and globules. Mechanical mixers at the surface or downhole may also be used to intimately mix the two phases. The size of the filaments and globules dispersed in the aqueous phase will depend upon the amount of energy imparted to the mixture. Excessive energy that could produce an emulsion should be avoided.

Another technique involves the sequential pumping of alternate volumes of the aqueous phase and the discontinuous phase. If the alternate liquid slugs are relatively small in volume, they will intermix in the wellbore forming a mixture of oil-in-water by the time the fluids reach the bottom of the well.

My invention may be carried out in conjunction with other treating techniques. For example, a preflush fluid, with or without acid, may be used in advance of the mixture. Also, an after flush liquid such as an acid solution or a mutual solvent-in-oil may be used after the mixture.

Additives may be used in the mixture provided they do not result in the formation of emulsions. This normally requires that the fluids of the mixture be substantially free of surface active agents.

The following illustrates one preferred mode for carrying out my invention. It is desired to acidize a ten-foot section of sandstone formation located at about 7000 feet. The pumping sequence is as follows:

(a) 500 gallons of 15% hydrochloric acid.
(b) 500 gallons of mud acid having dispersed therein 200 gallons of No. 2 diesel oil.
(c) 500 gallons of diesel oil containing 50 gallons of ethylene glycol monobutyl ether, a mutual solvent.

The injection pressure will be maintained at less than fracture pressure.

Although the present invention has been described with specific reference to matrix acidizing, it will be apparent to those skilled in the well treating art that it may be used in any well treatment where it is desired to agitate and dislodge fines within a porous medium.

I claim:

1. A method for treating a porous subterranean formation which comprises injecting, under matrix rates and pressures, a non-emulsified intimate mixture of an aqueous liquid forming a continuous phase and a fluid forming a discontinuous phase into said formation to cause two-phase flow through at least a portion of the porous formation, said mixture being substantially free of surface-active agents tending to form emulsions, said aqueous liquid comprising at least 60 volume percent of said mixture and being substantially immiscible with said fluid and being capable of wetting formation materials.

2. The method as defined in claim 1 wherein said aqueous liquid includes an acid solution capable of reacting with material in said formation.

3. The method as defined in claim 2 wherein said discontinuous phase is a hydrocarbon liquid substantially immiscible with said aqueous acid solution.

4. The method as defined in claim 3 wherein said hydrocarbon liquid is a hydrocarbon oil having an interfacial tension with water of at least 5 dynes per cm. at 72° F.

5. The method as defined in claim 3 wherein the hydrocarbon liquid constitutes at least 5 volume percent of said mixture.

6. The method as defined in claim 3 wherein the volumetric ratio of said acid solution and said hydrocarbon liquid ranges between about 3:2 and about 4:1.

7. The method as defined in claim 2 wherein said acid solution is aqueous hydrochloric acid.

8. The method as defined in claim 2 wherein said aqueous acid solution is a mud acid solution containing a mixture of hydrochloric and hydrofluoric acids.

9. A method as defined in claim 1 wherein said mixture comprises from about 60 volume percent to about 80 volume percent of the aqueous acid solution.

10. A method as defined in claim 1 and further comprising injecting into said formation after said mixture an acid solution capable of reacting with constituents in said formation.

11. The method as defined in claim 1 wherein said discontinuous phase is a gas.

* * * * *